UNITED STATES PATENT OFFICE 2,723,983

DISPROPORTIONATION OF HYDROCARBON ALKOXYSILANES

Donald Leroy Bailey, Buffalo, N. Y., assignor to Union Carbide and Carbon Corporation, a corporation of New York No Drawing. Application October 16, 1952, Serial No. 315,212

12 Claims. (Cl. 260—448.2)

This invention relates to a method for disproportionating hydrocarbon alkoxysilanes. More particularly, the invention is concerned with effecting in an assemblage of silicon-containing molecules each comprising at least one hydrogen atom, one hydrocarbon group, and one alkoxy group, a redistribution whereby a hydrocarbon silane and a hydrocarbon alkoxysilane are prepared.

The redistribution effected by the present invention may be generally shown as follows:

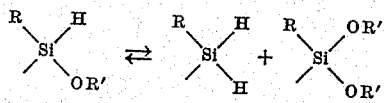

wherein R is a hydrocarbon radical containing only hydrogen and carbon atoms and R' is an alkyl radical. Connected to the silicon atom of the starting material by the free bond may be a hydrocarbon group, an alkoxy group, or hydrogen. More specifically, the above redistribution occurs as shown below:

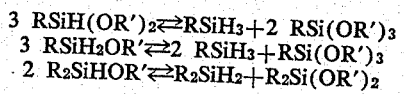

According to the present invention, the disproportionation of hydrocarbon alkoxysilanes is accomplished by treating such silanes with a suitable catalyst. For the catalyst, I prefer to employ an alkali metal alkoxide, for example, sodium or potassium ethoxide. The amount of catalyst employed is not critical and, as the preferred catalysts are readily available at reasonable costs, 0.2% or more may be used.

Disproportionation of hydrocarbon alkoxysilanes containing at least one hydrogen atom, one hydrocarbon group, and one alkoxy group occurs at temperatures below 50° C. However, as the reaction is in equilibrium, the disproportionation may be conducted at temperatures above 50° C. and preferably at reflux temperatures. By so doing, it is possible to remove the low-boiling hydrocarbon silane from the reaction mixture and therefore drive the reaction to completion with increased yield.

The method of disproportionation comprises placing the hydrocarbon alkoxysilane and catalyst in a flask connected to a fractionating column and heating to reflux temperatures. At this point, the hydrocarbon silane is evolved from the reaction mixture and may be readily collected at the head of the column.

The following examples more fully disclose the invention:

*Example I*

74.7 grams of ethyldiethoxysilane were added slowly to a flask containing 1.9 grams of sodium ethoxide. The reaction was quite slow at room temperature, so heat was applied. Before the mixture reached its refluxing temperature, 10–12 cc. of liquid ethylsilane had been collected. 59.7 grams of ethyltriethoxysilane were present in the material remaining in the flask. Upon calculation it was found the reaction was approximately 92% complete.

*Example II*

100 grams of phenyldiethoxysilane and 2 grams of sodium ethoxide were placed in a flask connected to a fractionating column. The mixture was heated to reflux and maintained for 2 hours, during which period phenylsilane was collected at the head of the column. The yield of phenylsilane was approximately 50.5 mole percent.

As hereinbefore disclosed, alkoxysilanes having at least one hydrogen atom, one hydrocarbon group, and one alkoxy group may be disproportionated by the method of my invention. The presence of two unidentical hydrocarbon groups attached to silicon does not alter the course of the reaction, and redistribution occurs in the same manner as if they were identical. For example, ethylmethylalkoxysilane and ethylphenylalkoxysilane would disproportionate as follows:

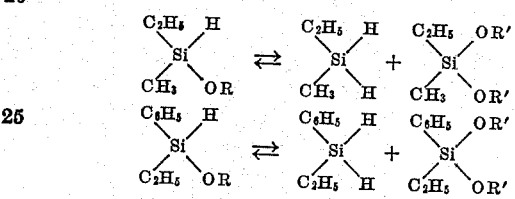

Also as hereinbefore disclosed, disproportionation occurs at temperatures below 50° C. At such temperatures the reaction is in equilibrium and the products are present in the reaction mixture. Under such conditions it is difficult to remove the products, and therefore it is preferred that the reaction be conducted at reflux temperatures, as at such temperatures the hydrocarbon silanes are evolved.

I claim:

1. A process of disproportionating a hydrocarbon alkoxysilane containing at least one hydrogen atom and at least one hydrocarbon radical attached to silicon which comprises treating said alkoxysilane with an alkali metal alkoxide and recovering a hydrocarbon silane.

2. A process of disproportionating a hydrocarbon alkoxysilane containing at least one hydrogen atom and at least one hydrocarbon radical attached to silicon which comprises treating said alkoxysilane at a temperature below 50° C. with an alkali metal alkoxide, whereby there is obatined a reaction mixture containing a hydrocarbon silane.

3. A process of disproportionating a hydrocarbon alkoxysilane containing at least one hydrogen atom and at least one hydrocarbon radical attached to silicon which comprises treating said alkoxysilane at a temperature above 50° C. with an alkali metal alkoxide and recovering a hydrocarbon silane.

4. A process of disproportionating a hydrocarbon alkoxysilane containing at least one hydrogen atom and at least one hydrocarbon radical attached to silicon which comprises treating said alkoxysilane at reflux temperatures with an alkali metal alkoxide and recovering a hydrocarbon silane.

5. A process of disproportionating an alkylalkoxysilane containing at least one hydrogen atom and at least one alkyl radical attached to silicon which comprises treating said alkoxysilane with an alkali metal alkoxide and recovering an alkylsilane.

6. A process of disproportionating an alkylalkoxysilane containing at least one hydrogen atom and at least one alkyl radical attached to silicon which comprises treating said alkoxysilane at reflux temperatures with an alkali metal alkoxide and recovering an alkylsilane.

7. A process of disproportionating an arylalkoxysilane containing at least one aryl radical attached to silicon which comprises treating said alkoxysilane with an alkali metal alkoxide and recovering an arylsilane.

8. A process of disproportionating an arylalkoxysilane containing at least one aryl radical attached to silicon which comprises treating said alkoxysilane at reflux temperatures with an alkali metal alkoxide and recovering an arylsilane.

9. A process of disproportionating an ethylethoxysilane containing at least one hydrogen atom and at least one ethyl radical attached to silicon which comprises treating said ethoxysilane with an alkali metal alkoxide and recovering ethylsilane and ethyltriethoxysilane from the reaction product.

10. A process of disproportionating ethyldiethoxysilane which comprises treating said ethoxysilane at reflux temperatures with sodium ethoxide and recovering ethylsilane and ethyltriethoxysilane from the reaction product.

11. A process of disproportionating a phenylethoxysilane containing at least one hydrogen atom and at least one phenyl radical attached to silicon which comprises treating said ethoxysilane with an alkali metal alkoxide and recovering phenylsilane.

12. A process of disproportionating phenyldiethoxysilane which comprises treating said ethoxysilane at reflux temperatures with sodium ethoxide and recovering phenylsilane.

References Cited in the file of this patent

UNITED STATES PATENTS

| | | |
|---|---|---|
| 2,276,094 | Rothrock | Mar. 10, 1942 |
| 2,530,367 | Hance | Nov. 21, 1950 |
| 2,626,273 | Hunter | Jan. 20, 1953 |
| 2,627,451 | Erickson | Feb. 3, 1953 |

OTHER REFERENCES

Calengaert et al.: "Journal Am. Chem. Soc.," vol. 16 (1939) pp. 2748–54.

Volnov: Journal Gen. Chem. (USSR), vol. 17 (1947) pp. 1428–35.